US012667745B2

(12) United States Patent
Aung Hla et al.

(10) Patent No.: US 12,667,745 B2
(45) Date of Patent: Jun. 30, 2026

(54) HOUSE FIRE FIGHTING TECHNIQUE

(71) Applicants: Peter Aung Hla, Washington, DC (US); Myint Myint San, Washington, DC (US)

(72) Inventors: Peter Aung Hla, Washington, DC (US); Myint Myint San, Washington, DC (US)

( * ) Notice: Subject to any disclaimer, the term of this patent is extended or adjusted under 35 U.S.C. 154(b) by 0 days.

(21) Appl. No.: 18/915,169

(22) Filed: Oct. 14, 2024

(65) Prior Publication Data

US 2025/0073514 A1 Mar. 6, 2025

(51) Int. Cl.
*A62C 99/00* (2010.01)
*A62C 3/02* (2006.01)

(52) U.S. Cl.
CPC ...... *A62C 99/0045* (2013.01); *A62C 99/0027* (2013.01); *A62C 99/009* (2013.01); *A62C 3/0242* (2013.01)

(58) Field of Classification Search
CPC .............. A62C 99/0045; A62C 99/009; A62C 99/0027; A62C 3/0242; A62C 15/00
USPC ................ 169/46, 13, 30; 239/152; 222/175
See application file for complete search history.

(56) References Cited

U.S. PATENT DOCUMENTS 102,431 A * 4/1870 Pinkham .............. A62C 13/003 169/71
3,367,280 A * 2/1968 Bennett ..................... F16L 1/00 182/51
3,682,250 A * 8/1972 Horwinski ............... A62C 3/16 169/5
4,053,001 A * 10/1977 Healey ................... A62C 13/76 141/2
5,540,284 A * 7/1996 Esposito ................ A62C 31/22 169/70

(Continued)

FOREIGN PATENT DOCUMENTS

AU 2022283754 2/2023
CN 115535243 12/2022

(Continued)

OTHER PUBLICATIONS

Fox59 News, "Home Zone: Getting extra use out of your leaf blower", Apr. 1, 2022, <https://www.youtube.com/watch?v=kDGCKLn7wkw> (Year: 2022).*

*Primary Examiner* — Kevin Edward Schwartz
(74) *Attorney, Agent, or Firm* — The Law Office of Kevin McDermott, P.L.L.C.

(57) ABSTRACT

This patent is about fighting house/apartment/condo/building fires by using dry ice and/or carbon dioxide gas. By the time people call the authorities, the fire has grown so big that it is difficult to control or to extinguish by ordinary fire fighting techniques. Traditional house fire fighting is to spray water into the house so that the flames would disappear and stop burning. This patent involves two methods: 1) throwing, spraying or spreading powder or flakes or pellets of dry ice on or near the fire or around the fire so that the carbon dioxide sublimating from it diffuses and expands to get to the fire or to fill up the house or around the house so that oxygen cannot get into the fire to continue burning; 2) spraying carbon dioxide gas into the house, apartment or building to bring down the oxygen level to stop the fire.

5 Claims, 4 Drawing Sheets

(56) References Cited

U.S. PATENT DOCUMENTS

| | | | | | |
|---|---|---|---|---|---|
| 6,035,940 | A * | 3/2000 | Bourke | A62C 31/24 134/198 |
| 9,663,234 | B1 | 5/2017 | Hanlon | |
| 9,833,647 | B2 | 12/2017 | Kawiecki | |
| 10,836,508 | B2 | 11/2020 | Overall et al. | |
| 11,433,266 | B2 * | 9/2022 | Farzam | A62C 5/004 |
| 11,938,356 | B1 * | 3/2024 | Wengreen | A62C 3/0242 |
| 2004/0163825 | A1 * | 8/2004 | Dunster | A62C 5/002 169/44 |
| 2009/0032272 | A1 * | 2/2009 | Duncan | A62C 13/64 220/585 |
| 2009/0205845 | A1 | 8/2009 | Hoffman | |
| 2010/0078184 | A1 * | 4/2010 | Pellittiere, II | A62C 31/12 169/51 |
| 2011/0266011 | A1 * | 11/2011 | Lee | A62C 37/12 169/52 |
| 2012/0160268 | A1 * | 6/2012 | Massey | B27K 3/0228 134/15 |
| 2014/0076996 | A1 * | 3/2014 | Hayton | A62C 31/12 239/289 |
| 2015/0096768 | A1 * | 4/2015 | DuBrucq | A62C 99/0018 169/46 |
| 2017/0043872 | A1 * | 2/2017 | Whitaker | B64C 27/00 |
| 2017/0231213 | A1 | 8/2017 | Gordon et al. | |
| 2019/0314657 | A1 * | 10/2019 | Hofmann | A62C 27/00 |
| 2021/0113870 | A1 * | 4/2021 | Ziegenfuss | A62C 3/0207 |
| 2021/0138281 | A1 * | 5/2021 | Nohmi | B64D 1/18 |
| 2023/0201645 | A1 * | 6/2023 | Cain, Sr. | A62C 99/0018 169/37 |
| 2023/0364457 | A1 * | 11/2023 | Oilar | A62C 33/04 |

FOREIGN PATENT DOCUMENTS

| | | | | |
|---|---|---|---|---|
| CN | 115535243 A | 12/2022 | |
| JP | 3217561 | 8/2018 | |
| WO | WO-2014022533 A1 * | 2/2014 | A62C 99/0081 |
| WO | WO 2014/080385 | 5/2014 | |
| WO | WO-2014080385 A2 * | 5/2014 | A62C 3/0228 |
| WO | WO-2019208440 A1 * | 10/2019 | A62C 3/0242 |
| WO | WO 2021/174291 | 9/2021 | |

* cited by examiner

HOUSE FIRE FIGHTING TECHNIQUE

TECHNICAL FIELD

The present disclosure relates to extinguishing house fires using carbon dioxide and dry ice.

BACKGROUND OF THE INVENTION

Shelby Hall wrote in "Fire Loss in the United States", "In 2022, local fire departments responded to an estimated 1.5 million fires in the United States. These fires caused 3,790 civilian fire deaths and 13,250 reported civilian fire injuries. The property damage caused by these fires was estimated at $18 billion. On average, a fire department responded to a fire somewhere in the US every 21 seconds in 2022. A home structure fire was reported every 88 seconds, a home fire death occurred every three hours and fourteen minutes, and a home fire injury occurred every 53 minutes."

U.S. Fire Administration reported that as of September 2024, 40 Firefighters and 1,403 civilians died because of fires.

Currently, spraying water on building fires by firefighters is the normal way of fighting house/building fires. By watching on Youtube at the videos of firefighters spraying water on house fires, it does not seem very effective. It is not easy as fires may be burning in an area unreachable directly by the water. Firefighters could be seen to direct the water into the windows or the roof. The fires kept burning because the water stream was unable to reach the fire behind the wall or inside the ceiling under the roof. Fires continued to burn for quite some time. Any valuable things in the house would also be damaged by water. Thus, it is apparent that we need a new and effective house fire firefighting technique.

BRIEF DESCRIPTION OF THE INVENTION

In one aspect of the present disclosure the use of powder or pellets or flakes of dry ice is provided to control or extinguish house, apartment, condo and building or other fires by throwing, spreading, dumping or spraying them into or around or on the fire scene or in, on or over or around the house or building.

In another aspect of the present disclosure the use and constructing or manufacturing of drones is provided and any similar drones that can carry dry ice and carbon dioxide gas to be spread or sprayed remotely.

In another aspect of the present disclosure the use of carbon dioxide gas from cylinders carried by people, for example, firefighters or by drones, or by fire trucks to spray into, on or around a burning building/house/apartment to extinguish the fire is provided.

In one embodiment of the present disclosure when carbon dioxide gas is sprayed into a building, if the pipe carrying the carbon dioxide gas needs to be longer, it should be supported by a long rigid pole or the spray end of the pipe to spray carbon dioxide gas should be carried by a drone to higher places.

In another embodiment of the present disclosure the use of fans or leaf-blowers to blow off the excess carbon dioxide through windows, doors or openings after the fire is provided.

DETAILED DESCRIPTION OF THE INVENTION

Figure 1:
FIG. 1 is a sectional view of an example plastic container for carrying packages of dry ice to a house fire.

FIG. 1 is a sectional view of an example plastic container for carrying packages of dry ice to a house fire.

Figure 2:
FIG. 2 is a sectional view of another example plastic container for carrying packages of dry ice to a house fire.

FIG. 2 is a sectional view of another example plastic container for carrying packages of dry ice to a house fire.

Figure 3:
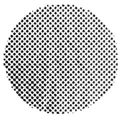
FIG. 3 is a top view of an example plastic sheet with very small holes for packing dry ice to be thrown into a burning building.

FIG. 3 is a top view of an example plastic sheet with very small holes for packing dry ice to be thrown into a burning building.

Figure 4:
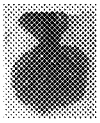
FIG. 4 is a front view of a dry ice pack in which dry ice is wrapped in a plastic sheet and the circular edge of the plastic sheet is collected and gripped together without tying with a string.

FIG. 4 is a front view of a dry ice pack in which dry ice is wrapped in a plastic sheet and a circular edge of the plastic sheet is collected and gripped together to form the dry ice pack without tying with a string.

Dry ice and carbon dioxide cylinders can be carried in bulk to where a fire is burning. If it is possible to throw the dry ice into the building by the firefighters, powder of dry ice can be put on the plastic sheet and the circular edge collected into a bunch to form a dry ice pack as shown herein with regard to FIG. 4. The dry ice packs are carried in plastic containers, for example, the plastic containers described herein with regard to FIGS. 1 and 2. The dry ice packs must not be tied up. The packs can be thrown by the firefighters into or around the building. Since the plastic sheets are not tied by strings, once the dry ice packs hit the floor, dry ice will spread out which enables the dry ice to sublimate more easily.

Using Dry Ice:

Once firefighters arrive at a house fire, packages of dry ice powder/small pellets/flakes should be thrown into the house from any available doors and windows. The packages or buckets of dry ice should be packed in a way to allow the dry ice to spread out as much as possible after being thrown. Dry ice should be placed on a plastic sheet and the edges should be picked up or collected and hold tight together without tying up with strings. When this pack of dry ice is thrown into the window or door, it will release all the dry ice which will spread out onto the floor. The more it spreads, the more quickly it sublimates. If the fire is burning upstairs, dry ice can even be thrown into the doors or windows downstairs because the carbon dioxide from it can be sucked up to the fires.

Firefighters may decide that it is better to have drones carry the dry ice packs into the building. Drones carrying powder of dry ice should be flown into the house to dump packages of pellets of dry ice or spray or spread the powder of dry ice in as many rooms as possible. After emptying the powder of dry ice, the drones can come out to refill and repeat the process again.

Figure 5:
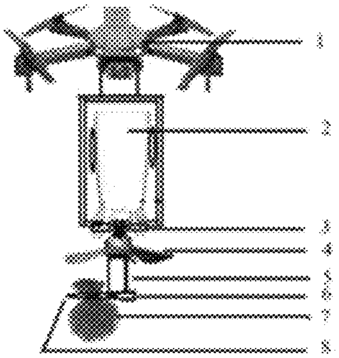
FIG. 5 is a sectional view of an example drone carrying dry ice to be spread out in a burning building.

FIG. 5 is a sectional view of an example drone 1 carrying dry ice to be spread out in a burning building. The drone 1 has a width less than the width of most doors and windows. A container 2 for dry ice is positioned in the drone 1. The container 2 must not be totally closed. Additionally, the drone 1 includes a controllable opening 3 to two dry ice dropping pipes, a dry ice spreader fan 4, and a payload release mechanism 5. The two dry ice dropping pipes are for dry ice to drop. Each pipe comes from an opening in the drone. The openings are controlled to open or close separately. The fan 4 underneath is to spread the dry ice that drops onto it. The fan 4 will spread the dry ice that drops from on opening to one side and from the other opening to the other side. By closing one side, the other side will spread dry ice to only one side of the drone 1.

The drone 1 also includes a hook 6 attached to a string. The string is attached to the payload release mechanism 5 and can get detached from the payload release mechanism 5. A dry ice pack 7 is positioned to hang by the string 8 tied between the hook 6 and the payload release mechanism 5. The string 8 ties the dry ice pack 7 to the payload release mechanism 5 and the hook 6.

The payload release mechanism 5 can be controlled remotely to drop the dry ice pack 7. The drone 1 has at least one camera. As a result, drone operators can direct the drone 1 as close as possible to the fire before dropping/spreading/spraying/dumping/the dry ice remotely. The drone 1 should have holes to let carbon dioxide gas to escape.

The information shown in FIG. 6 includes some of the same information shown in FIG. 5 as described in more detail below. As such, features illustrated in FIG. 6 that are identical to features illustrated in FIG. 5 are identified using the same reference numerals used in FIG. 5.

Figure 6:
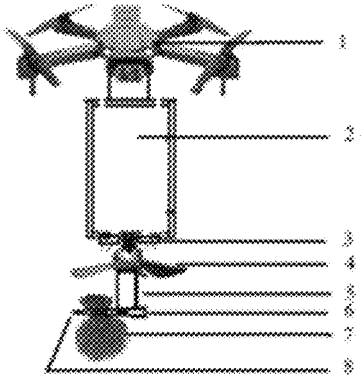
FIG. 6 is a sectional view of another example drone carrying dry ice to be spread out in a burning building.

FIG. 6 is a sectional view of another example drone carrying the dry ice pack 7 to be spread out in a burning building similar to the drone 1 shown in FIG. 5. However, the drone does not include the container 2.

Figure 7:
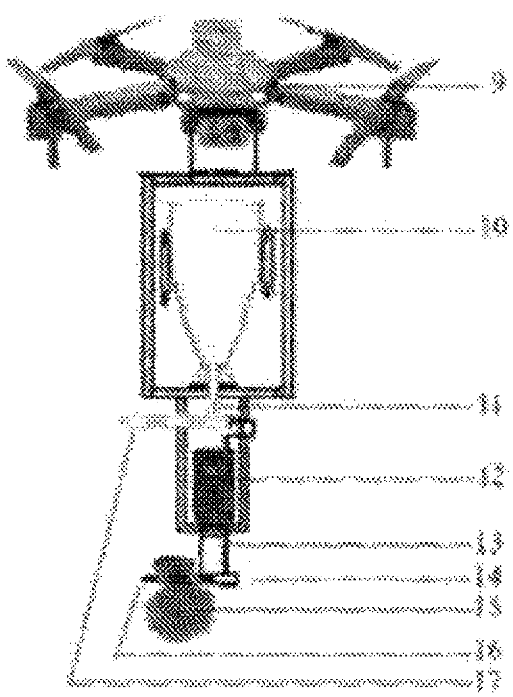
FIG. 7 is a sectional view of yet another example drone carrying dry ice to be sprayed in a burning building.

FIG. 7 is a sectional view of another example drone 9. The drone 9 also has a width less than the width of most doors and windows. The drone 9 also includes a dry ice dropping container 10. The container 10 must not be totally closed. A pipe 11 extends from the container 10 to drop dry ice into a dry ice spraying pipe 17. The drone 9 has only one opening in the bottom for dry ice to drop into the pipe 11 to spray the dry ice. An air pump 12 pumps air into the spray pipe 17 to facilitate spraying the dry ice through the spray pipe 17. The air pump 12 will push the dry ice out to spray the dry ice towards the fire.

The drone 9 also includes a payload release mechanism 13. A string 16 is attached to the payload release mechanism 13. A hook 14 attached to the sting 16 can be detached from the payload release mechanism 13. A dry ice pack 15 is positioned to hang from the string 16 tied between the payload release mechanism 13 and the hook 14.

The payload release mechanism 13 can be controlled remotely to drop the dry ice pack 15. The drone 9 has at least one camera. As a result, drone operators can direct the drone 9 as close as possible to the fire before dropping/spreading/spraying/dumping/the dry ice remotely. The drone 9 should have holes to let carbon dioxide gas to escape.

The information shown in FIG. 8 includes some of the same information shown in FIG. 7 as described in more detail below. As such, features illustrated in FIG. 8 that are identical to features illustrated in FIG. 7 are identified using the same reference numerals used in FIG. 7.

Figure 8:
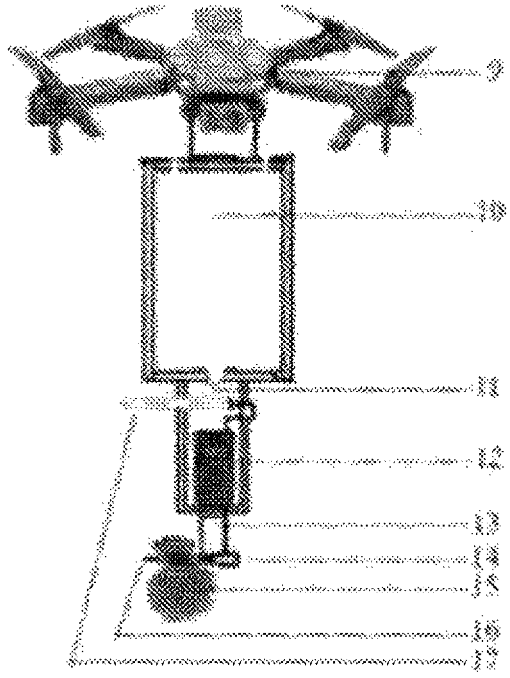
FIG. 8 is a sectional view of another example drone carrying dry ice to be sprayed in a burning building.

FIG. 8 is a sectional view of another example drone carrying the dry ice pack 15 to be spread out in a burning building similar to the drone 9 shown in FIG. 7. However, the drone does not include the container 10.

Figure 9:
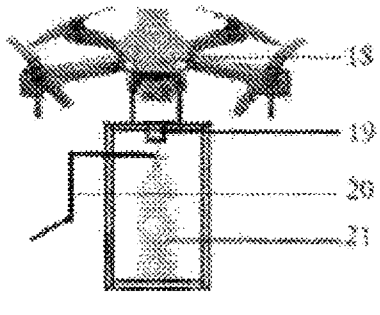
FIG. 9 is a sectional view of yet another example drone carrying a carbon dioxide cylinder

FIG. 9 is a sectional view of another example drone 18 for carrying a cylinder 21 of carbon dioxide. The drone 18 also includes a remote-controlled turn on valve 19 for allowing carbon dioxide to flow from the cylinder 21 through a pipe 20 and to stop the flow through the pipe 20. The carbon dioxide released from the cylinder 21 flows through the pipe 20 to spray carbon dioxide on a fire.

The drone 18 has at least one camera. As a result, drone operators can direct the drone 18 as close as possible to the fire before dropping/spreading/spraying/dumping/the dry ice remotely. The drone 18 should have holes to let carbon dioxide gas to escape.

Figure 10:
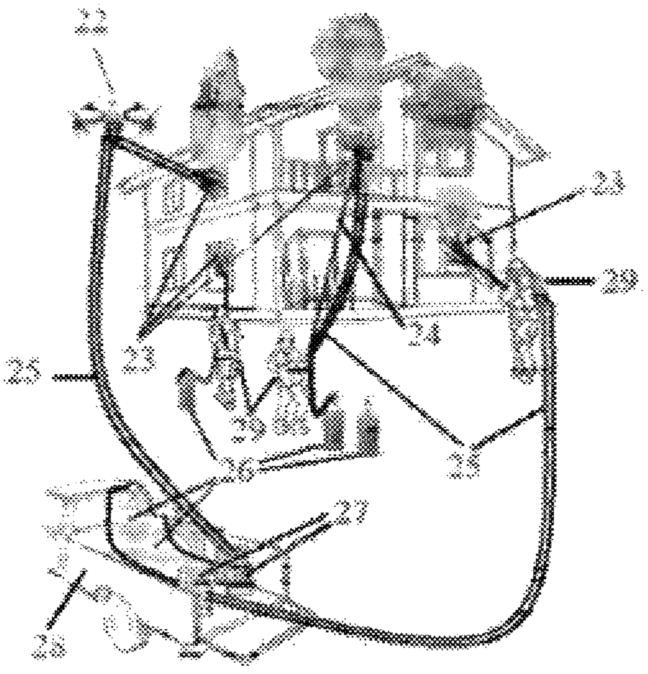
FIG. 10 is a diagram illustrating use of dry ice, carbon dioxide gas, and drones to fight a fire with Firefighters.

FIG. 10 is a diagram illustrating use of dry ice, carbon dioxide gas, and drones to fight a fire with firefighters 27. More specifically, drones 22 carrying dry ice or carbon dioxide may spray carbon dioxide out of a spray pipe 25. The pipes 25 carry cardon dioxide liquid from the carbon dioxide cylinders 26. The spray pipe 25 may need support. Thus, a long straight pole 24 may be used to support the spray pipe 25 that is carrying the carbon dioxide liquid.

Figure 11:
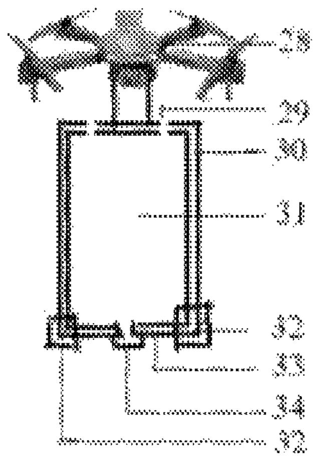
FIG. 11 is a sectional view of yet another example drone for dumping dry ice in a burning building.

FIG. 11 is a sectional view of yet another example drone 28 for dumping dry ice in a burning building. The drone 28 includes holes 29 to release carbon dioxide gas and a container 30 to carry dry ice. There is a hinge 32 of a bottom door 33 that facilitates opening the door 33 to release dry ice. The drone 28 also includes a door lock 34 that is remotely controlled. Thus, it is contemplated by the present disclosure that the drone 28 may be used to carry dry ice and dump as much as one wants by controlling the door lock 34.

The drone 28 has at least one camera. As a result, drone operators can direct the drone 28 as close as possible to the fire before dropping/spreading/spraying/dumping/the dry ice remotely. The drone 28 should have holes to let carbon dioxide gas to escape.

It is contemplated by the present disclosure that the drone 1, drone 9 and the drone 28 described herein can be controlled to come out and refill again.

Figure 12:
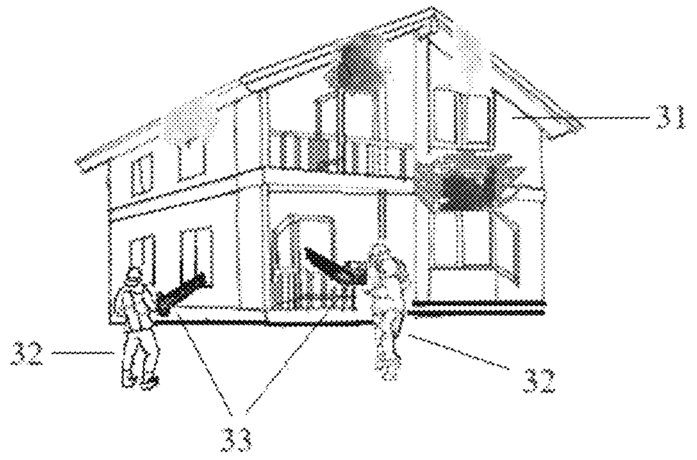
FIG. 12 is a diagram illustrating use of fans or leaf blowers to blow off excess carbon dioxide gas through windows, doors or openings after the fire is extinguished.

FIG. 12 is a diagram illustrating use of fans or leaf blowers to blow off excess carbon dioxide gas through windows, doors or openings after the fire is extinguished.

Figure 13:
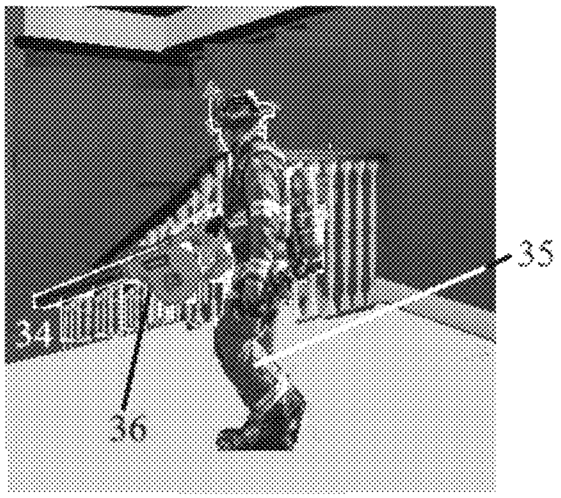
FIG. 13 is a diagram illustrating use of fans or leaf blowers to blow off excess carbon dioxide gas from basements or lower levels after the fire is extinguished.

FIG. 13 is a diagram illustrating use of fans or leaf blowers to blow off excess carbon dioxide gas from basements or lower levels after the fire is extinguished.

Powder of dry ice can also be spread outside of the building especially, over the windward side of the fire if fire is burning outside of the building. With other large fires, dry ice has to be spread on the fire and on all sides of the fire to cut off the oxygen from the surrounding area. The air around the fire is 78% nitrogen, 21% oxygen, 0.9% argon and 0.04% carbon dioxide. With plenty of oxygen, the fire will burn brighter and as the carbon dioxide produced by the burning is hot, it rises and creates low pressure at the base of the fire which sucks in more oxygen to burn.

Oxygen content needs to be more than 15% in the air for diffusion flame production and when the carbon dioxide from the dry ice expands and rushes into the fire, it stops burning as there is more carbon dioxide around the fire. Kate S. Zalzal wrote for the Earth Magazine saying, "They have found that fires, even if ignited, will not propagate if the atmospheric oxygen concentration is below 16 percent. At our modern oxygen level of 20.9 percent, fires ignite and propagate readily."

When cold carbon dioxide from dry ice overwhelms the inside of the house and the surrounding area, oxygen cannot get near the fire and the fire will die down.

Powder of dry ice will be sprayed or spread out over the fire or close to the fire. The powder or flake of dry ice is small enough to sublimate quickly after hitting the floor. The drone that sprays dry ice can be flown closer to the fire and can spray dry ice directly into the fire for it to quickly sublimate because of the heat.

Dry ice is frozen carbon dioxide. It sublimates, that is, evaporates directly into gas at 78.5 degrees celsius or 109.2 degrees Fahrenheit. Before the carbon dioxide gas gets to standard temperature (0 degree Celsius), it absorbs the heat from the scene of the fire and as it gets hotter, it expands. This cools the temperature of the scene of the fire.

Carbon dioxide molecule has one carbon atom (atomic weight 12) and two oxygen atoms (each has atomic weight 16). As carbon dioxide has a molecular weight of 44 (12+16+16), there is 44 grams in one mole. One mole of gas at standard temperature and pressure (STP) (0 degree celsius and 1 atmosphere) is 22.4 liters. So, one pound (454 grams) of dry ice will produce about 231 liters (61 gallons) of carbon dioxide gas at STP. The temperature at the fire scene can be hundreds of degrees. Let's assume it is about 200 degrees celsius, although the temperature could be up to more than 1000 degrees celsius. According to Boyle's and Charles' law $P_1V_1/T_1=P_2V_2/T_2$, the volume of carbon dioxide from the one pound of the dry ice without considering the air pressure would be more than 400 liters or more than 105 gallons. If 10 lbs. of dry ice are dropped in the house, the volume of carbon dioxide would be more than 1,000 gallons. When this carbon dioxide pushes into the fires, oxygen does not have a chance to get in and combine with the fuel. As a result, the house fire will be extinguished.

University of Massachusetts Amherst says in its Environmental Health & Safety page under the heading "What are the hazards", "Cryogens and dry ice can expand 700 to 900 times their volume upon boiling/sublimation." Department of Biology at the University of York says on its website that 10 kg of dry ice sublimes into about 5.4 cubic meters of carbon dioxide gas. That means 22 lbs. of dry ice sublimes into 1426 gallons and if this expands 800 times, it would be about 1,140,000 gallons. Additionally, the expansion ratio of dry ice is 845. That means 1 lb. of dry ice would sublime into 6.5 gallons of carbon dioxide. So, if this gas is heated from 78 degrees Celsius to 200 degrees, the volume would be more than 158 gallons. 100 lbs. of dry ice would produce more than 15,800 gallons of carbon dioxide gas occupying the whole house. However, it should be noted that not all the dry ice would sublimate immediately into gas once it gets in the burning house.

Fire engine trucks hold from about 300 to 1,250 gallons of water with an average of 500 gallons. Water sprayed on fires does not expand like dry ice and extinguish fires only on contact even though the steam coming out of the fire does suppress the fire. Most of the water just flows down the floors and to the ground. Properties in the house are also damaged by the water. However, carbon dioxide is gas and will not damage properties in the house.

A fire that is burning has only three elements: Fuel (wood or furniture), flames and oxygen from the air. Fuel and oxygen combine with the help of the heat from the flames and produce hot carbon dioxide and other toxic fumes and soot which rise up into the sky because hot air is lighter. Oxygen from the cold surrounding air rushes in towards the flames because the pressure at the base of the fire is low and so the burning goes on. When the carbon dioxide from the dry ice expands and comes up from the floors, it pushes out the oxygen from the surrounding air that is rushing in to the flames. The flames cannot get enough oxygen to continue burning and the fire is snuffed out. This carbon dioxide from dry ice, unlike the hot carbon dioxide that comes out of the burning flames, is quite cold and so it does not rise up but rushes in to the fires because the low pressure surrounding the burning flames suck in the cold carbon dioxide instead of oxygen. In turn, the fire stops burning because it cannot get enough of the oxygen it needs.

The volume of carbon dioxide from the dry ice is several times greater than the water or fire retardants and also it can extinguish fires that the dry ice does not touch because the cold carbon dioxide can rush towards adjacent fires or fires behind the wall or in another room. So, using dry ice to extinguish fires is much better.

The cost of dry ice is about $1.00 per lb. carbon dioxide to produce dry ice is reclaimed from industries and so it is not only cheap but also does not harm the environment. In addition to dry ice, carbon dioxide gas from cylinders can also be used to fight house fires.

Using Carbon Dioxide Gas:

Firefighters can carry a 10 lb., 20 lb. or 50 lb. carbon dioxide cylinders on their backs or by hand and can spray the gas into any opening of the house or building or a condo apartment. Drones carrying carbon dioxide cylinders can be sent out to spray the gas into the windows or doors or into the house or room where the fire is burning. They don't have to even enter the building. If the fire is too big, each fire fighter could even use two cylinders at the same time to spray carbon dioxide gas into an opening. The gas will expand and reduce the ratio of available oxygen to below 16% so that fire can stop burning. Carbon dioxide just needs to dilute oxygen to below 16% to snuff out the fire. Fire fighters should be careful because carbon dioxide spray coming out of the cylinders can be very cold and could hurt eyes and skins.

It should be noted that carbon dioxide is heavier than air and will flow to lower levels and if there are people in the house, people inside the room or basement or lower floors will not be able to get enough oxygen to breathe. After the fire is extinguished, big fans or leaf blowers can be turned on to push the carbon dioxide out until it is safe for people to enter the house of the building or the apartment.

Fire trucks can also carry bigger carbon dioxide cylinders and plastic pipes and (garden hoses) reels. Instead of unrolling water truck hose and joining them, just unrolling the long plastic pipe will save time. Firefighters can then aim the carbon dioxide gas into the doors or windows or openings of the house or building to extinguish the fire. The spraying end of the hose can even be carried by drones to higher rooms.

Not every local Fire and EMS station in a city needs to store dry ice or carbon dioxide cylinders. Only a few of the stations need to store them and bring to the house fire when necessary.

There are important things to note when using dry ice and carbon dioxide as firefighting agent. Firefighters handling dry ice should be trained in the handling and dangers of it. It cannot be in totally closed box. It must not be handled with bare hands. It cannot be transported in a car with windows closed. People handling dry ice need to wear safety glasses. If there are people in the building, firefighters should consider whether it is prudent to use dry ice. Both the fire with toxic fumes and the carbon dioxide from the dry ice can kill a living person. Firefighters going into the house after the fire dies down must be careful. Carbon dioxide from the fire and from the dry ice or the carbon dioxide cylinder will linger in the house and any person or animal may die from lack of oxygen. So as soon as it is safe to go into the house, it should be immediately checked to see whether someone is inside. If so, they should be immediately treated and bring out to fresh air.

A website "co2meter dot com" says, "$CO_2$ cylinder pressure is about 860 psi at normal room temperature. Typical $CO_2$ cylinders store about 20 lbs, or 50 lbs. of liquid $CO_2$. Two pounds of liquid $CO_2$ expands to about 20 cubic feet of gaseous $CO_2$ at atmospheric pressure, or expands at a rate of 535:1. This means that in an enclosed room the $CO_2$ gas can quickly fill with $CO_2$ and either poison an individual or displace all the oxygen available for breathing. Because $CO_2$ is heavier than air it will also fill any low areas like basements or under floor service areas first. If there is little air movement, pools of $CO_2$ can exist for many hours. Liquid $CO_2$ temperature is also important. If the gas escapes quickly, it is discharged at sub-zero temperatures and produces a mixture of $CO_2$ gas and "snow". This "$CO_2$ snow" is momentarily the same temperature as dry ice, about −110F or −79C, and can quickly result in frostbite or frozen skin." However, most of the carbon dioxide would be sucked up by the low pressure of the fire.

When fighting metal fires, one should be careful about the use of dry ice. "Note that certain metals react exothermically with nitrogen or carbon dioxide, so the only acceptable inert gases for these metals are helium and argon. Halons should not be used on metal fires." (PDH online Course M282: Fire Dynamics Series: Fire Protection Fundamentals. Instructor: Lawrence J. Marchetti. p-31).

One should also know that according to Hazmat University, dry ice is regulated in transportation and shipping is limited to 200 Kg (441 lbs.). Whoever handles carbon dioxide cylinders should also be familiar with 46 CFR § 147.65—Carbon dioxide and Halon fire extinguishing systems.

There are three ways to spray carbon dioxide into a building that is burning: from one or two cylinders that a firefighter is carrying, or from drones carrying carbon dioxide cylinders, or by using a plastic pipe directly coming from a fire truck carrying a bigger carbon dioxide cylinder. If a fire is too big, one firefighter can hold two spray pipes coming out of two cylinders at the same time.

If the fire is in a room several floors up, the spray pipe can be carried by a drone to spray into the opening. If firefighter has oxygen tank, he can go inside to spray.

After the fire is extinguished, fans or leaf-blowers are used to blow off the remaining carbon dioxide in the house or building for people to safely enter it.

What is claimed is:

1. A method of extinguishing a fire comprising steps of:

carrying, by a fire fighter on a back of the fire fighter, one cylinder only of carbon dioxide gas and a plastic pipe, the plastic pipe including a first end orifice and a second end orifice only, the first end orifice of the plastic pipe being communicatively connected to the one cylinder;

spraying, via the second end orifice only of the plastic pipe, by the fire fighter without using drones, carbon dioxide gas only from the one cylinder into, on or around a burning building, house or apartment to reduce a ratio of oxygen available in air that is feeding the fire to below fifteen percent to extinguish the fire, wherein carbon dioxide gas remaining after the fire is extinguished flows to lower levels of the building, house or apartment; and blowing the remaining carbon dioxide gas out of the lower levels so people can breathe in the lower levels.

2. The method according to claim 1, wherein the plastic pipe is configured to be supported by a rigid pole or an extendable pipe.

3. A method of extinguishing building fires comprising steps of:

carrying, by a fire truck, one cylinder of carbon dioxide gas;

delivering, by the fire truck, the one cylinder of carbon dioxide gas to a site of a building fire;

communicatively connecting a first end orifice of a plastic pipe to the one cylinder of carbon dioxide gas, the plastic pipe including the first end orifice and a second end orifice only;

spraying, via the second end orifice only of the plastic pipe without using drones, carbon dioxide gas only from the one cylinder of carbon dioxide gas on the building fire, wherein the carbon dioxide gas is sucked into the building fire to reduce a ratio of oxygen available in air that is feeding the fire to below fifteen percent to extinguish the building fire, and carbon dioxide gas remaining after the fire is extinguished flows to lower levels of a building in which the fire was extinguished; and blowing the remaining carbon dioxide gas out of the lower levels so people can breathe in the lower levels.

4. The method according to claim 3, further comprising aiming the second orifice end of the plastic pipe at openings in the building to spray the carbon dioxide gas into the building, wherein the carbon dioxide gas expands and reduces an amount of oxygen causing the building fire to be extinguished.

5. A method of extinguishing a fire comprising steps of:

carrying, by a fire fighter on a back of the fire fighter, one cylinder only of carbon dioxide gas and a plastic pipe, the plastic pipe including a first end orifice and a second end orifice only, the first end orifice of the plastic pipe being communicatively connected to the one cylinder;

reducing a ratio of oxygen available in air that is feeding the fire to below fifteen percent to extinguish the fire by spraying, via the second end orifice only of the plastic pipe, by the fire fighter without using drones, carbon dioxide gas only from the one cylinder into, on or around a burning building, house or apartment, wherein carbon dioxide gas remaining after the fire is extinguished flows to lower levels of the building, house or apartment; and blowing the remaining carbon dioxide gas out of the lower levels so people can breathe in the lower levels.

* * * * *